United States Patent
Arrigoni et al.

(10) Patent No.: US 9,535,412 B2
(45) Date of Patent: Jan. 3, 2017

(54) ELECTRICAL ASSEMBLY FOR SELECTIVELY OPERATING A HOUSEHOLD APPLIANCE IN A DEMONSTRATION MODE OR A STANDARD MODE

(75) Inventors: Giancarlo Arrigoni, Cassacco (IT); Edi Fabbro, Bertiolo (IT); Paolo Farris, Aiello del Fr. (IT); Mauro Taiariol, Porcia (IT); Stefano Toppan, Cordenons (IT)

(73) Assignee: Electrolux Home Products Corporation N.V., Brussels (BE)

( * ) Notice: Subject to any disclaimer, the term of this patent is extended or adjusted under 35 U.S.C. 154(b) by 188 days.

(21) Appl. No.: 13/516,562

(22) PCT Filed: Dec. 7, 2010

(86) PCT No.: PCT/EP2010/069101
§ 371 (c)(1),
(2), (4) Date: Jun. 15, 2012

(87) PCT Pub. No.: WO2011/073061
PCT Pub. Date: Jun. 23, 2011

(65) Prior Publication Data
US 2012/0248879 A1 Oct. 4, 2012

(30) Foreign Application Priority Data
Dec. 17, 2009 (EP) ..................... 09179750

(51) Int. Cl.
*G05B 17/02* (2006.01)
*G05B 19/042* (2006.01)

(52) U.S. Cl.
CPC ............. *G05B 19/042* (2013.01); *G05B 17/02* (2013.01); *G05B 2219/23452* (2013.01);
(Continued)

(58) Field of Classification Search
CPC ..................................................... G05B 17/02
(Continued)

(56) References Cited

U.S. PATENT DOCUMENTS 5,801,637 A  9/1998 Lomholt
5,932,130 A * 8/1999 Taino ........................... 219/702
(Continued)

FOREIGN PATENT DOCUMENTS

DE   197 46 423        4/1999
JP   2012147979 A  *   8/2012
(Continued)

OTHER PUBLICATIONS

International Search Report issued in corresponding International Application No. PCT/EP2010/069101, mailed Mar. 30, 2011.
(Continued)

*Primary Examiner* — Adi Amrany
(74) *Attorney, Agent, or Firm* — Banner & Witcoff, LTD.

(57) ABSTRACT

An electrical assembly is provided for selectively operating a household appliance in a demonstration mode or a standard mode. A logic unit (2) is adapted to control the electrical and/or electronic components of the household appliance (1), and to make the household appliance (1) perform a standard mode or a demonstration mode. A power supply device (5), external to the household appliance (1), is adapted to deliver electric power to the household appliance (1). The household appliance (1) comprises a power supply circuit (3) adapted to be connected to the power supply device (5) or directly to the supply mains (4), in order to energize the logic unit (2) and the other electrical and/or electronic components of the household appliance (1). The household appliance (1) further comprises a detection device (9) adapted to detect if the power supply circuit (3) is connected to the power supply device (5) or directly to the
(Continued)

supply mains (4). The logic unit (2) is configured to enable the performing of the demonstration mode if the detection device (9) detects that the power supply circuit (3) is connected to the power supply device (5), and to enable the performing of the standard mode if the detection device (9) detects that the power supply circuit (3) is connected directly to the supply mains (4).

18 Claims, 5 Drawing Sheets

(52) U.S. Cl.
CPC .............. *G05B 2219/25359* (2013.01); *G05B 2219/2654* (2013.01); *Y10T 307/696* (2015.04)

(58) Field of Classification Search
USPC ............................................ 307/72, 116, 125
See application file for complete search history.

(56) References Cited

U.S. PATENT DOCUMENTS

| | | | |
|---|---|---|---|
| 6,647,102 B2* | 11/2003 | Hirai et al. .............. | 379/100.01 |
| 7,058,479 B2* | 6/2006 | Miller ........................... | 700/284 |
| 7,224,086 B2* | 5/2007 | Germagian ............ | A45C 13/02 |
| | | | 307/128 |
| 7,826,240 B2* | 11/2010 | Xu ................................ | 363/142 |
| 8,310,207 B2* | 11/2012 | De Cremoux ................ | 320/137 |
| 8,688,530 B2* | 4/2014 | Ebrom et al. ................ | 705/26.1 |
| 2004/0041933 A1* | 3/2004 | Fredlund et al. ........ | 348/333.01 |
| 2008/0007647 A1* | 1/2008 | Masuda ........................ | 348/372 |
| 2008/0109243 A1* | 5/2008 | Ebrom et al. ..................... | 705/1 |
| 2009/0306827 A1* | 12/2009 | Kim et al. ..................... | 700/275 |
| 2010/0060082 A1* | 3/2010 | Qu .................................. | 307/72 |
| 2011/0004325 A1* | 1/2011 | Ayal ............................... | 700/17 |
| 2012/0032514 A1* | 2/2012 | Alberghetti et al. ........... | 307/48 |

FOREIGN PATENT DOCUMENTS

| | | |
|---|---|---|
| KR | 20040095777 | 11/2004 |
| WO | 2008/090432 | 7/2008 |

OTHER PUBLICATIONS

Extended European Search Report issued in corresponding European Application No. 09179750.6, dated Jun. 23, 2010.

* cited by examiner

ELECTRICAL ASSEMBLY FOR SELECTIVELY OPERATING A HOUSEHOLD APPLIANCE IN A DEMONSTRATION MODE OR A STANDARD MODE

BACKGROUND OF THE INVENTION

The present invention relates to an electrical assembly for selectively operating a household appliance in a demonstration mode or a standard mode.

Nowadays household appliances, for example refrigerators, washing machines, oven, etc., are usually exposed in shops by placing a great number of them aligned side by side on the shop floor.

The differences in the external appearance of the various household appliances of a same kind are often small, while the technical characteristics and the operational functions of different appliances of the same kind may be very different.

There is therefore the need to give to the possible customers a way to appreciate, directly in the shop (or in other exposition places, such as a trade fair), the operational functions of the household appliance, so as to help costumers to choose the appliance which best meets theirs requirements.

In order to satisfy this need, there have been developed some household appliances adapted to operate in a demonstration mode, called also "demo mode", that is a functional mode which allows the user to interact with the user interface (usually comprising a display and an input device, such as a keyboard or one or more buttons or knobs) of the household appliance substantially in the same way as if the household appliance would really work, but without really activating the main loads of the household appliance (e.g. compressors, motors, pumps, heating elements, etc.). The demo mode could also comprise the representation via the user interface of some information regarding the household appliance, for instance the power consumption, a description of the operational functions, some instructions, etc. In this way the user can learn and also practise on the various functions of the household appliance, even if the latter doesn't really operate.

For example in the demo mode a user could practice on setting and activating the washing programs of a washing machine, a rapid cooling function in a refrigerator, a particular cooking program in an oven, etc.

An example of a household appliance provided with a demo mode function is illustrated, for instance, in KR 20040095777, which discloses a control device of an oven display unit and a method thereof, which are provided to operate the display unit of the oven according to place or time, by selecting the normal operation mode and the demo mode, with a demo mode setting switch before supplying power; the control device and the method are also adapted to improve the safety and the reliability by an automatically stopping function of the oven in the demo mode. The control device of the oven display unit comprises a demo mode setting switch for selecting the demo mode by a user.

Another electrical appliance (in this case a shaving apparatus) provided with a demo mode function is disclosed for example in U.S. Pat. No. 5,801,637; in this case the shaving apparatus is powered by a rechargeable battery. The shaving apparatus comprises a display with signs for indicating a status of operational functions of the apparatus, such as the residual charge of the battery and the residual number of usage periods. The shaving apparatus further comprises a control system for activating the signs in dependence on a condition of use of the apparatus during a cycle of use which corresponds to recharging and to discharging of the rechargeable battery. The control system includes a demonstration mode for demonstrating on the display a cycle of use of the apparatus, by displaying in an accelerated manner the signs in the sequence of their appearance during the cycle of use. If the shaving apparatus is connected to the mains voltage, a microcontroller, comprised in the shaving apparatus, detects the connection to the mains voltage and can choose from a single demonstration or a recurrent demonstration.

Usually, in the known household appliances provided with a demo mode function, the demo mode is activated by pushing a particular combination of keys provided on the user interface of the appliance.

In some of these known household appliances the demo mode is automatically disabled if the household appliance is switched off and/or if no electric power is supplied to the household appliance; this feature involves a drawback, which will be explained in the following. When these known household appliances are exposed in a store, many of these household appliances are usually connected to a same electric line which provides the power supply to all of them (the power supply is necessary, for example, in order to perform the demo mode); in order to avoid energy wastage, the electric line is typically not powered when the store is closed (for example during the night), so as to switch off all the household appliances connected to the electric line. Since the demo mode of these known household appliances is automatically disabled if the household appliance is switched off and/or if no electric power is supplied to the household appliance, when the electric line is powered once more, the demo mode of this kind of household appliance is not active, and therefore it has to be manually activated by an operator; this operation may require a lot of time, in particular if there are many household appliances, and therefore sometimes the demo mode isn't activated.

There are however other known household appliances in which both in order to enable the demo mode and in order to disable the demo mode it is necessary to push a specific combination of keys; in this case, once the demo mode has been activated, it remains active even after the power off and the successive power on of the household appliance.

However, also these known household appliances have a drawback; in fact sometimes it happens that a household appliance is sold after, the demo mode has been activated, and if the customer isn't aware that the household appliance is in the demo mode, he could believe that its new household appliance doesn't function correctly, with the consequent discomfort due to the need of calling the customer service.

Moreover, even if the user is aware that the household appliance is performing the demo mode, he might not know how to disable the demo mode, and therefore also in this case he could have the need of calling the customer service.

Moreover in both the two known kinds of household appliances described above, there is the risk that a user might inadvertently activate the demo mode during the functioning of the household appliance (for example by an accidental pushing of the keys), which may cause, for example, the deterioration of the objects of which the household appliance is operating; for example, if the household appliance is a refrigerator, the activation of the demo mode during the real functioning of the appliance may cause the products contained in such a refrigerator to get warm, and therefore to quickly rotten.

SUMMARY OF SELECTED INVENTIVE ASPECTS

The aim of the present invention is therefore obtaining an electrical assembly for selectively operating a household appliance in a demonstration mode or a standard mode which allows enabling the performing the demo mode only when it is needed (for example when the household appliance is exposed in a store) without requiring a user to directly operate on the household appliance in order to enable/disable the performing of the demo mode.

Within this aim, another object of the present invention is avoiding an ill-timed automatic activation of the demo mode function of a household appliance during the real functioning of the latter.

Another object of the invention is avoiding that a household appliance could remain accidentally in a demo mode after selling.

It is therefore an object of the present invention to solve the above-noted problems, thereby doing away with the drawbacks of the cited prior art.

The Applicant has found that by providing an electrical assembly including a household appliance, for selectively operating the household appliance in a demonstration mode or a standard mode, wherein the household appliance is adapted to perform a standard mode and a demonstration mode, and may be powered by a power supply device, external to the household appliance, or directly by the supply mains, and by providing the household appliance with a detection device which detects if the household appliance is powered by the power supply device or directly by the supply mains, and by configuring the household appliance so as to enable the performing of the demonstration mode if it is powered by the power supply device and to enable the performing of the standard mode if it is powered directly by the supply mains, it is possible to have the demonstration mode of the household appliance enabled exactly when it is needed, without the need of enabling again the demo mode after each power off of the household appliance, but also without the risk that the demo mode would remain enabled after the selling of the appliance.

In particular, the above-mentioned aim and objects, as well as others that will become better apparent hereinafter, are achieved by an electrical assembly for selectively operating a household appliance in a demonstration mode or a standard mode. In particular, in an aspect, the invention provides:
  a household appliance comprising a logic unit adapted to control the electrical and/or electronic components of the household appliance, and to make the household appliance to perform a standard mode or a demonstration mode; and
  a power supply device, external to the household appliance, adapted to deliver electric power to the household appliance.

The household appliance comprises a power supply circuit adapted to be connected to the power supply device or directly to the supply mains, in order to energize the logic unit and the other electrical and/or electronic components of the household appliance. The household appliance further comprises a detection device adapted to detect if the power supply circuit is connected to the power supply device or directly to the supply mains; the logic unit is configured to enable the performing of the demonstration mode if the detection device detects that the power supply circuit is connected to the power supply device, and to enable the performing of the standard mode if the detection device detects that the power supply circuit is connected directly to the supply mains.

Advantageously the logic unit may be configured in such a way that the demonstration mode automatically starts substantially as soon as the detection device detects that the power supply circuit is connected to the power supply device.

In a further embodiment the logic unit is configured in such a way that after enabling the performing of the demonstration mode, the demonstration mode is started if an action is performed by a user on a user interface provided in the household appliance and/or if an action is performed by a user on an input device provided in the power supply device. In a further embodiment thereof, the household appliance and/or the power supply device comprises a presence sensor adapted to detect the presence of a user in proximity to the household appliance and/or to the power supply device, and to communicate to the logic unit the presence of this user, the logic unit being configured in such a way that, if the performing of the demonstration mode has been enabled, the demonstration mode starts if the presence sensor senses the presence of an user.

Advantageously the power supply device may comprise at least a battery and a DC-AC converter adapted to convert the direct power and/or current and/or voltage produced by the battery in a substantially alternated power and/or current and/or voltage provided with one or more electric characteristics different from the corresponding electric characteristics of the power and/or current and/or voltage provided by the supply mains, this DC-AC converter being adapted to provide this alternated power and/or current and/or voltage to the household appliance.

Preferably the alternated power and/or current and/or voltage outputted by the DC-AC converter has a frequency which is different from the frequency of the power and/or current and/or voltage provided by the supply mains.

In a preferred embodiment, the at least one battery of the power supply device is rechargeable, and the power supply device comprises a battery charger arranged in such a way that it may be electrically connected to the supply mains, so as to receive from the latter the electric power for recharging the battery.

In another embodiment of the invention, the power supply device is electrically connectable to the supply mains and comprises an AC-AC converter with input connections which are connectable to the supply mains, and with outlet connections which are connectable to the household appliance, the AC-AC converter being configured so as to convert the alternated electric power and/or current and/or voltage delivered by the supply mains in an alternated electric power and/or current and/or voltage with one or more different electric characteristics.

Opportunely the detecting device is adapted to detect one or more electric characteristics of the power and/or current and/or voltage which is delivered to the power supply circuit, the detecting device being operatively connected to the logic unit, so as to communicate to the latter information related to the one or more electric characteristics of the power and/or current and/or voltage which it detects.

Preferably the alternated power and/or current and/or voltage outputted by the AC-AC converter has a frequency which is different from the frequency of the power and/or current and/or voltage provided by the supply mains.

Opportunely the detecting device is adapted to detect one or more electric characteristics of the power and/or current and/or voltage which is delivered to the power supply circuit, the detecting device being operatively connected to the logic unit, so as to communicate to the latter an information related to the one or more electric characteristics of the power and/or current and/or voltage which it detects.

Preferably the detecting device is adapted to detect the value of the frequency of the power and/or current and/or voltage present at the power supply circuit, the logic unit being configured so as to enable the performing of the demonstration mode if the frequency detected by the detecting device is different from one or more prefixed values corresponding to a frequency provided by the supply mains and/or if the frequency detected by the detecting device is substantially equal to a prefixed value which is different from the value of the frequency of the supply mains.

In a preferred embodiment, the power supply device comprises a transmitting device adapted to transmit to a receiving device, comprised in the household appliance and operatively associated to the detecting device, a signal related to the fact that the power supply device is connected to the household appliance.

Another aspect of the present invention concerns a household appliance comprising:
- a logic unit adapted to control the electrical and/or electronic components of the household appliance, and to cause the household appliance to perform both a standard mode and a demonstration mode; and
- a power supply circuit adapted to be connected directly to the supply means or to a power supply device in order to energize the logic unit and the other electrical and/or electronic components of the household appliance.

The household appliance further comprises a detection device adapted to detect if the power supply circuit is connected to the power supply device or directly to the supply mains; the logic unit is configured to enable the performing of the demonstration mode if the detection device detects that the power supply circuit is connected to the power supply device, and to enable the performing of the standard mode if the detection device detects that the power supply circuit is connected directly to the supply mains.

A further aspect of the present invention concerns a method for selectively operating a household appliance in a demonstration mode or a standard mode, comprising the following phases:
   a) connecting the household appliance directly to the supply mains or to a power supply device, external to the household appliance, adapted to deliver electric power to the household appliance;
   b) detecting, by a detection device provided in the household appliance, if the household appliance is connected to the power supply device or directly to the supply mains, and
   c) enabling, by a logic unit provided in the household appliance, the performing of a demonstration mode if the household appliance is connected to the power supply device, or the performing of a standard mode if the household appliance is connected directly to the supply mains.

BRIEF DESCRIPTION OF THE DRAWINGS

Features and advantages of the present invention will be more readily understood from the description that is given below by way of non-limiting example with reference to the accompanying drawings, in which.

DETAILED DESCRIPTION OF EXAMPLE EMBODIMENTS

Figure 1:
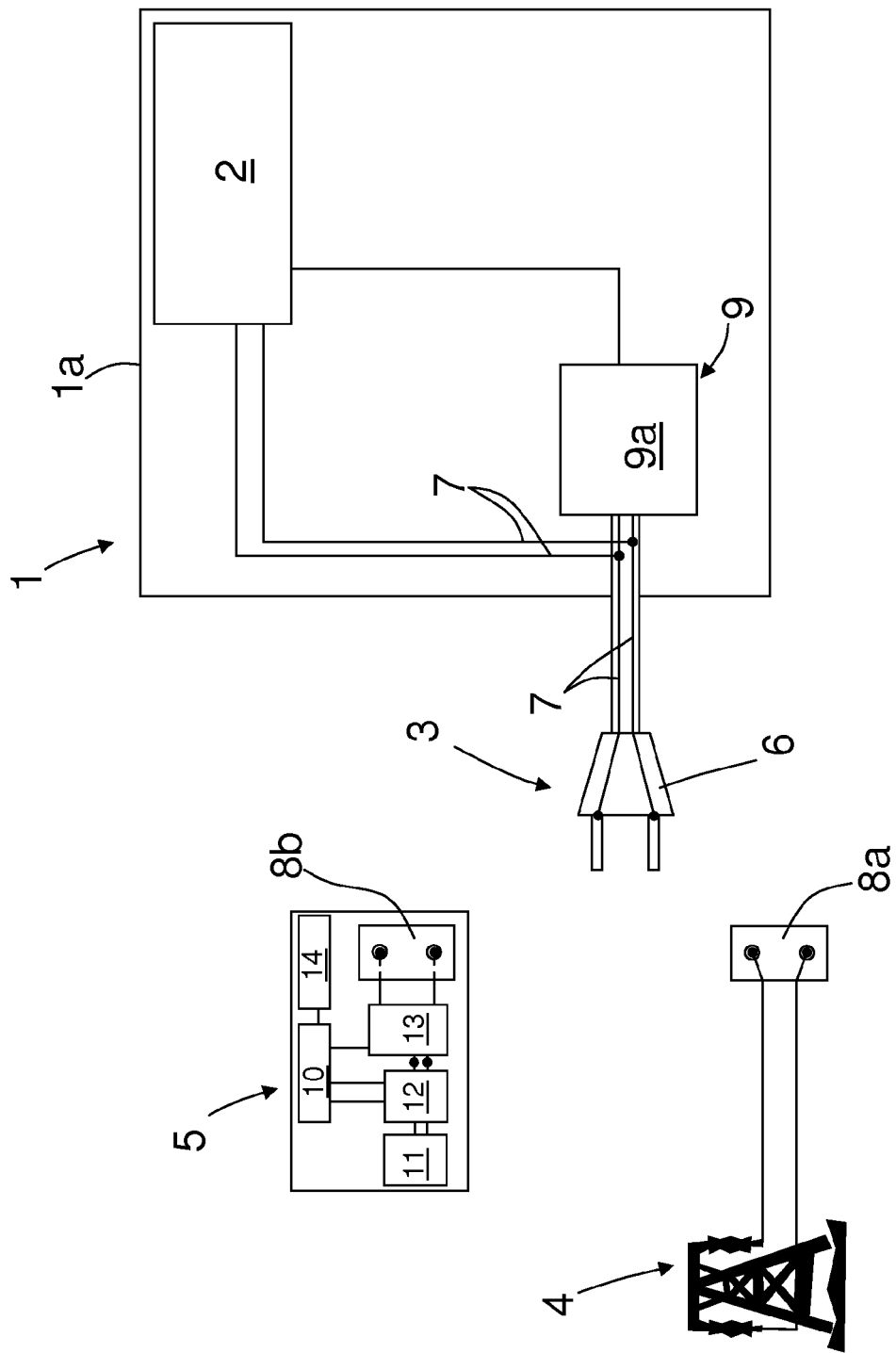
FIG. 1 is a schematic view of an electrical assembly according to the invention.

FIG. 1 schematically illustrates an electrical assembly comprising a household appliance 1 which could be, for instance a refrigerator, a freezer, an oven, a dishwasher, a laundry machine, a drying machine, a washer-dryer, a vacuum cleaner, etc.

The household appliance 1 comprises an external casing, schematically represented in the enclosed Figures by the block numbered 1a, containing various mechanical and electrical devices adapted to perform the functions for which the household appliance 1 is designed. In the enclosed Figures and in the following description the above mentioned mechanical and electrical devices comprised in the external casing 1a of the household appliance 1 (for example, in the case of a refrigerator, the access door, the refrigeration circuit, the shelves or trays for the product to preserve, the user interface, etc., in the case of a washing machine the washing tub, the washing drum, the water circuit, the motor for rotating the drum, the user interface, etc.) have not been illustrated nor described, since they are well known in the art.

The household appliance 1 according to the invention comprises a logic unit 2 configured to control the electrical and electronic components of the household appliance 1; these electrical and electronic components could comprise, for example, an electric motor, a compressor, a pump, an electric heater, a loudspeaker, a user interface, etc.

For example the logic unit could 2 comprise a general purpose programmable microcontroller, for instance the microcontroller sold by Freescale Semiconductor Inc. with the code MC9S08AW32.

The logic unit 2 is also configured to cause the household appliance 1 to perform a standard mode (i.e. the normal functioning mode of the household appliance 1) or a demonstration mode; the demonstration mode could comprise, for instance, the visualisation on a display of images and/or writings, the emission of sounds from a loudspeaker, the possibility for the user to select, by an input device, some information to display on the display or some actions or functions of the household appliance to simulate, an action performed by one or more movable components of the household appliance (for example the rotation of the washing drum in the case of a washing machine), etc.

While the household appliance 1 is performing the demonstration mode the user has therefore the possibility to actively interact with the household appliance 1, so as, for instance, to obtain information about the functioning of the latter, and/or to practice on the functions which can be performed.

It is clear that in the demonstration mode all the functions of the household appliance 1 (e.g. a washing cycle in a washing machine, a slow cooling function in a refrigerator, a particular cooking sequence in an oven, etc.) are only simulated, while the household appliance 1 isn't really operating in the same way as during its real functioning.

Preferably, but not necessarily, during the performing of the demonstration mode the main loads of the household appliance 1 (e.g. compressors, motors, pumps, heater, etc.) aren't activated.

For example, if the household appliance 1 is a refrigerator, after activating the demonstration mode a user can operate on the input device of the refrigerator in the same way as if he would really activate the various functioning of the refrigerator (e.g. a rapid cooling function, a silent mode function, etc); the refrigerator doesn't really activate these functions, but the logic unit 2 commands the output device of the user interface in such a way to perform the same actions (e.g. to display the same images and/or to generate the same sounds or noises) as if the refrigerator would really operate.

The household appliance 1 comprises a power supply circuit 3 adapted to be connected directly to the supply mains 4, or to a further power supply device 5, comprised in the electrical assembly but external to the household appliance 1, and which will be better described in the following, in order to energize the logic unit 2 and the other electrical and electronic components of the household appliance 1.

In the embodiment illustrated in the enclosed Figures, the power supply circuit 3 comprises for example a plug 6, electrically connected, advantageously via suitable cables 7, to the logic unit 2 and to the other electrical and electronic components of the household appliance 1; advantageously the power supply circuit 3 may comprise other electric or electronic component, for example an electrical or electronic transformer, a rectifier, etc., which have not been illustrated since they are well known in the art.

Advantageously the plug 6 is adapted to be associated to a suitable socket 8a electrically connected or connectable to the supply means 4.

Opportunely, a similar socket 8b is provided also in the power supply device 5, so that, as it will be better explained in the following, the plug 6 may be electrically connected to the power supply device 5 via the socket 8b; more generally the power supply device 5 is provided with an outlet connector (which in this example comprises the socket 8b), adapted to be connected to the power supply circuit 3 of the household appliance 1, so as to allow the transferring of the electric power from the power supply device 5 to the household appliance 1.

Advantageously the household appliance 1 further comprises a detection device 9, which will be better described in the following, adapted to detect if the power supply circuit 3 is connected to the power supply device 5, or if it is connected directly to the supply mains 4.

The logic unit 2 is configured to enable the performing of the above mentioned demonstration mode if the detection device 9 detects that the power supply circuit 3 is connected to the power supply device 5, and to enable the performing of the standard mode if the detection device 9 detects that the power supply circuit 3 is connected directly to the supply mains 4.

It is underlined that for the purposes of the present invention, the expression "enabling the performing of the demonstration mode" means to place the household appliance 1 in a condition in which the demonstration mode could be performed.

In a first embodiment of the present invention, the logic unit 2 is advantageously configured in such a way that the demonstration mode automatically starts substantially as soon as the detection device 9 detects that the power supply circuit 3 is connected to the power supply device 5.

In a further embodiment the logic unit 2 may be advantageously configured in such a way that, after enabling the performing of the demonstration mode, this latter doesn't start immediately, but it may be afterward started by a user, for example by acting on a user interface, not illustrated, of the household appliance 1, or on a further suitable input device, also not illustrated, provided in the power supply device 5 and adapted to start the demonstration mode (e.g. a button, a knob, a remote controller, etc).

In a further embodiment thereof, the electrical assembly comprises a presence sensor, for example a proximity sensor (i.e. an inductive sensor, a capacitive sensor, an infrared sensor, etc.), not illustrated, provided in the household appliance 1 and/or in the power supply device 5 and adapted to detect the presence of a user in proximity to the household appliance 1 and/or in proximity to the power supply device 5, and to communicate to the logic unit 2 (for example by the transmission of a suitable electric signal) the presence of this user; in this case the logic unit 2 is configured in such a way to start the demo mode when the presence sensor senses the presence of an user (clearly only if the detection device 9 has detected that the power supply circuit 3 is connected to the power supply device 5, and therefore the performing of the demo mode have been enabled by the logic unit 2); in this case, after the logic unit 2 has enabled the demo mode, the demo mode starts if the proximity sensor detects that a user is placed in proximity of the household appliance 1 and/or of the power supply device 5.

In another embodiment, also not illustrated, the logic unit 2 may be configured in such a way that even if the performing of the demo mode has been enabled, the demo mode automatically starts/ends only at a prefixed time, corresponding, for example, to the opening time of a store.

Figure 2:
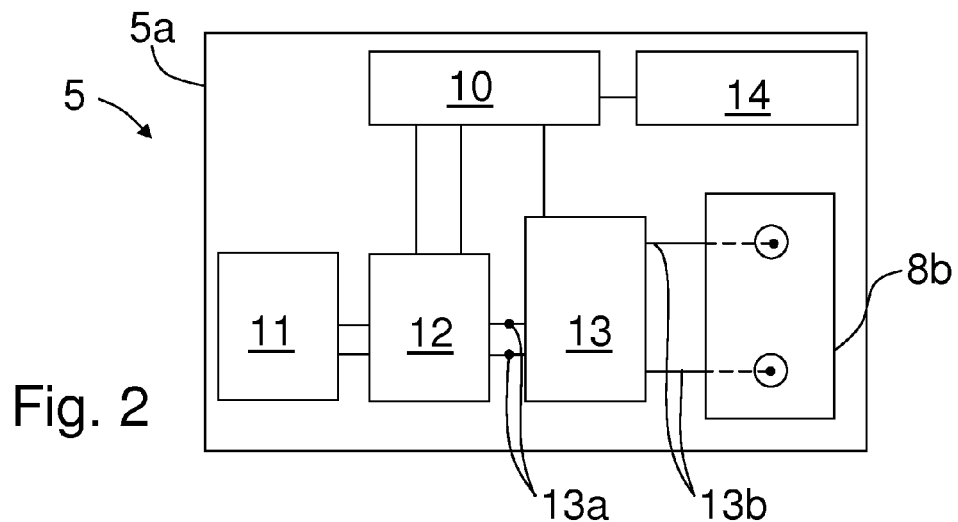
FIG. 2 is a schematic view of the power supply device of the electrical assembly of FIG. 1.

In the first embodiment illustrated in FIGS. 1 and 2 the power supply device 5 advantageously comprises an external casing 5a comprising an electronic control unit 10, for example a microcontroller, adapted to control all the functions of the power supply device 5; advantageously the power supply device 5 comprises at least a battery 11, rechargeable or not, adapted to provide electric power to the electronic control unit 10 and to all the other electrical and/or electronic devices of the power supply device 5.

In the embodiment illustrated in FIG. 2, the power supply devices 5 advantageously comprises an electric feeder 12, connected between the battery 11 and to the other electrical and/or electronic devices comprise in the power supply device 5 (i.e. the electronic control unit 10), adapted to convert the electric power provided by the battery 11 in a form adapted to be used by these electrical and/or electronic devices (for example the electric feeder may reduce or increase the value of the voltage provided by the battery 11). In a further embodiment, not illustrated, the battery 11 may be also directly connected to the various electrical and/or electronic devices of the power supply device 5, without the electric feeder 12 (which in this case may be not provided).

In the embodiment of FIGS. 1 and 2 the power supply device 5 advantageously comprises a DC-AC converter 13 adapted to convert the direct current (DC) (or direct voltage or direct power) produced by the battery 11, in a substantially alternated current (AC) (or alternated voltage or alternated power) provided with one or more electric characteristics (i.e. the frequency, and/or the intensity, and/or a particular modulation) different from the corresponding electric characteristics of the power and/or current and/or voltage provided by the supply mains 4.

For example, in the embodiment of FIGS. 1 and 2, the DC-AC converter 13 is adapted to convert the direct power and/or current and/or voltage produced by the battery 11 in a substantially alternated power and/or current and/or voltage with a prefixed frequency, different form the frequency of the alternated power and/or current and/or voltage provided by the supply mains 4.

In the embodiment of FIGS. 1 and 2, the DC-AC converter 13 comprises two inlet connections 13a, electrically connected to the electric feeder 12 (but they may be also connected directly to the battery 11), and two outlet connections 13b, electrically connected to the outlet connector of the power supply device 5 (and therefore, in the example of FIGS. 1 and 2, electrically connected to the socket 8b to which may be associated the plug 6 of the household appliance 1), in such a way that the substantially sinusoidal power and/or current and/or voltage produced by the DC-AC converter 13 is delivered to this outlet connector; in the example of FIGS. 1 and 2, therefore, by inserting the plug 6 in the socket 8b, this substantially sinusoidal power and/or current and/or voltage is delivered to the household appliance 1.

Preferably, but not necessarily, the DC-AC converter 13 is controlled by the electronic control unit 10.

For example, the DC-AC converter 13 may be arranged in such a way that the frequency of the sinusoidal power and/or current and/or voltage present at its outlet connections 13b (and therefore at the outlet connector of the power supply device 5), is different from the frequency of the power and/or current and/or voltage provided by the supply mains 4 (which nowadays, substantially all over the world, is 50 Hz or 60 Hz).

Preferably, but not necessarily, the frequency of the sinusoidal power and/or current and/or voltage generated by the DC-AC converter 13, and therefore present at the socket 8b, is substantially 70 Hz; in fact this frequency is different from the frequency provided nowadays by the supply mains substantially all over the word, and at the same time it is adapted to be used, without generating technical problems, by the most part of the electric and electronic devices which are designed to be used at 50 Hz or 60 Hz.

However any other frequency, as long as different from the frequency provided by the supply mains 4, may be used.

Preferably, but not necessarily, the power supply device 5 comprises a user interface 14 (comprising for example a display, and one or more input devices, i.e. keys, not illustrated), adapted, for example, for allowing a user to check the power level of the battery 11, to set the functions of the power supply device 5, to set a particular frequency of the power and/or current and/or voltage present at the socket 8b, etc.

In the embodiment of FIGS. 1 and 2, the detecting device 9 of the household appliance 1 is advantageously adapted to detect one or more electric characteristics (i.e. the frequency, and/or the intensity) of the power and/or current and/or voltage which is delivered to the power supply circuit 3; the detecting device 9 is operatively connected to the logic unit 2, so as to communicate to the latter an information related to these one or more electric characteristics of the power and/or current and/or voltage which it detects.

For example, in the embodiment of FIGS. 1 and 2, the detecting device 9 of the household appliance 1 advantageously comprises a main voltage detector 9a, that is an electronic component electrically connected to the power supply circuit 3 of the household appliance 1 and adapted to detect the intensity and/or the frequency of the voltage (and/or of the current and/or of the power) delivered to the power supply circuit 3; for example in the embodiment illustrated in FIGS. 1 and 2, the main voltage detector 9a is adapted to detect the frequency of the voltage applied to the plug 6.

The main voltage detector 9a is operatively connected to the logic unit 2, so as to communicate to the latter the frequency of the voltage (and/or of the current and/or to the power) applied to the plug 6 (and/or an electric signal related to this frequency).

The main voltage detector 9a may be integrated in a same electronic board with the logic unit 2, or it may be separated by the latter.

In the embodiment of FIGS. 1 and 2, the logic unit 2 is advantageously configured so as to enable the performing of the demonstration mode if the frequency at the plug 6 detected by the main voltage detector 9a is different from one or more prefixed values corresponding to the frequency (for example 50 Hz or 60 Hz) provided by the supply mains 4.

In a further embodiment the logic unit 2 may be configured so as to enable the performing of the demonstration mode if the frequency at the plug 6 detected by the main voltage detector 9a is substantially equal to a prefixed value (which is different form the value of the frequency of the supply mains 4) corresponding to the frequency of the power and/or current and/or voltage produced by the DC-AC converter 13. For example, since nowadays substantially all over the world the frequency of the voltage of the supply means is 50 Hz or 60 Hz, the DC-AC converter 13 may produce a power and/or current and/or voltage with a frequency of 70 HZ, and the logic unit 2 may configured in such a way to enable the performing of the demonstration mode if the frequency at the plug 6 detected by the main voltage detector 9a is substantially 70 Hz (or also if the detected frequency is different from 50 Hz or 60 Hz).

Preferably, but not necessarily, the DC-AC converter 13 is configured so as to generate a frequency which is sufficiently different from the frequency of the supply mains 4 so that the main voltage detector 9a may recognize it as different from the frequency provided by the supply mains 4, but which is also close to the frequency of the supply mains 4, so that the logic unit 2 and the other electric and electronic components of the household appliance may function correctly with this frequency (for example the frequency produced by the DC-AC converter may be 70 Hz or 75 Hz).

It is underlined that a main voltage detector is often present in known household appliances in order to detect the intensity and the frequency of the voltage supplied by the supply mains; in fact some electronic components of the known household appliances need, in order to perform some specific functions, a reference value of the frequency and/or of the intensity of the voltage, and in these known household appliances the value of the frequency provided by the supply mains and detected by the main voltage detector is used as reference value.

If the household appliance 1 is already provided with a main voltage detector 9a, therefore, the invention may be applied to this household appliance 1 without any hardware modification; in fact in this case it is sufficient to configure the logic unit 2 (for example by a software modification) in such a way that it enables or disables the performing of the demonstration mode depending on the frequency value detected by the main voltage detector 9a.

Figure 3:
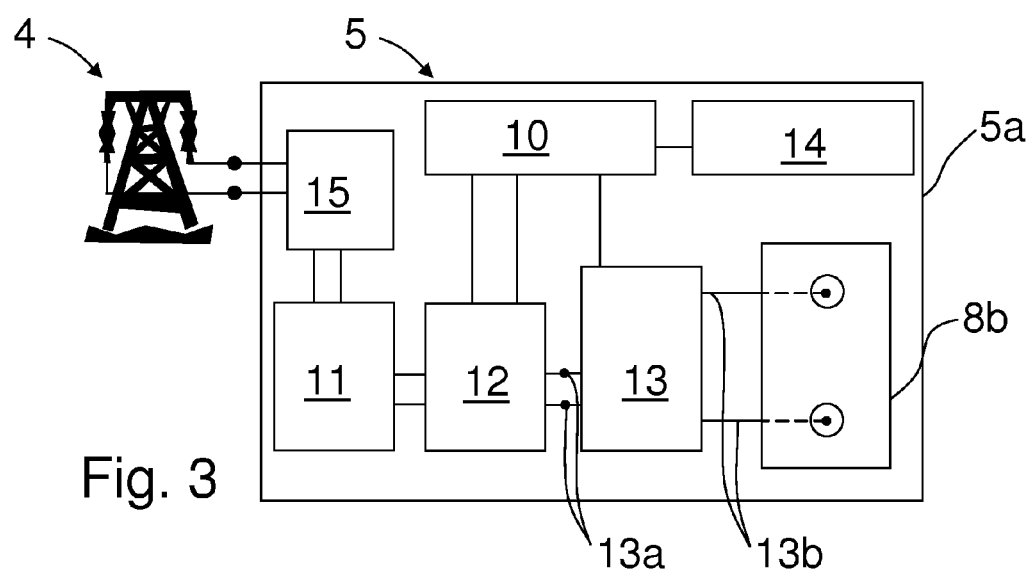
FIG. 3 is a schematic view of a second embodiment of a power supply device of an electrical assembly according to the invention.

In a further embodiment, illustrated in FIG. 3, the battery 11 of the power supply device 5 is rechargeable, and the power supply device 5 comprises a battery charger 15 arranged in such a way that it may be electrically connected to the supply mains 4, so as to receive from the latter the electric power necessary for recharging the battery 11.

Figure 4:
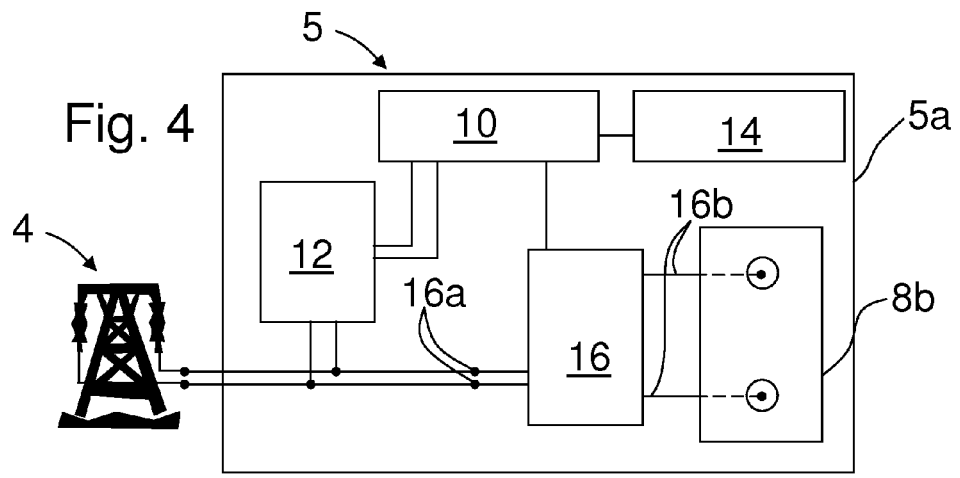
FIG. 4 is a schematic view of a third embodiment of a power supply device of an electrical assembly according to the invention.

In a further embodiment thereof, illustrated in FIG. 4, the battery 11 isn't provided, and the power supply device 5 is electrically connectable to the supply mains 4; in this embodiment the power supply device 5 is provided with an electric feeder 12 which may be connected to the supply mains 4 and which is adapted to convert the electric power provided by the supply means 4 in a form adapted to be used by the electrical and/or electronic devices of the power supply device 5. In this embodiment the power supply device 5 comprises an AC-AC converter 16 which inlet connections 16a are connectable to the supply mains 4, and which outlet connections 16b are connectable to the household appliance 1; for example, in the embodiment of FIG. 4 the outlet connections 16b are connected to the outlet connector of the power supply device 5 (which in this case comprise the socket 8b), so that they are connected to the power supply circuit 3 when the latter is connected to the outlet connector of the power supply device 5 (in the example of the enclosed Figures, when the plug 6 is connected to the socket 8b).

The AC-AC converter 16 is configured in such a way to convert the alternated electric power and/or current and/or voltage delivered by the supply mains 4 in an alternated electric power and/or current and/or voltage with one or more different characteristics (for example with a different frequency and/or different amplitude, and or with a particular modulation, etc.). For example, in the embodiment of FIG. 4 the AC-AC converter 16 is configured in such a way to convert the frequency of the alternated electric power and/or current and/or voltage provided by the supply mains 4 in an alternated electric power and/or current and/or voltage with a different frequency; in this way an electric power with a prefixed frequency, different from the frequency of the supply mains 4, is delivered to the socket 8b. Therefore, when the household appliance 1 is connected to the power supply device 5, even if the latter is powered by the supply mains 4, the main voltage detector 9a of the household appliance 1 detects a frequency which is different form the frequency of the supply mains 4, and therefore the logic unit 2 enables the demo mode.

In another embodiment, not illustrated, the AC-AC converter is comprised in the electric feeder 12.

Figure 5:
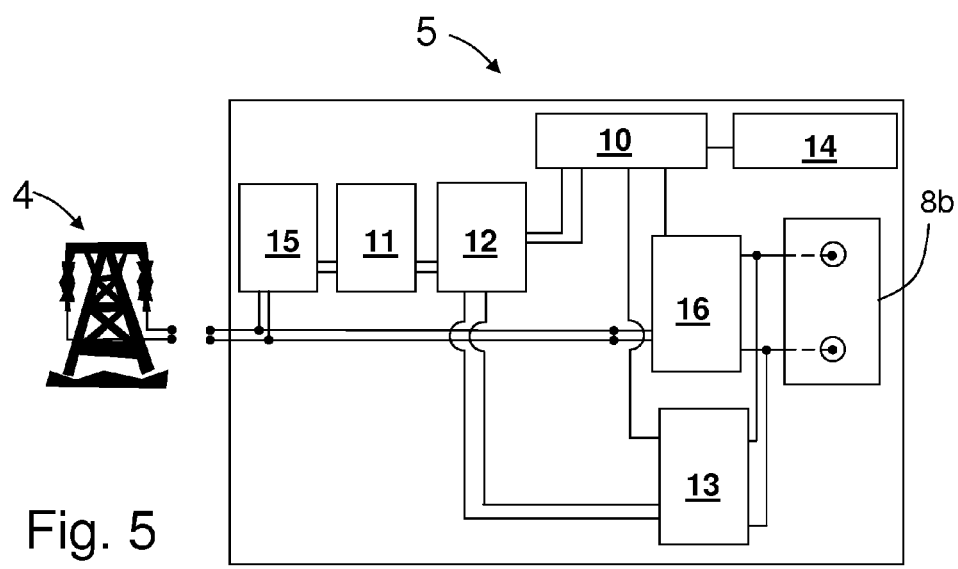
FIG. 5 is a schematic view of a fourth embodiment of a power supply device of an electrical assembly according to the invention.
Figure 6:
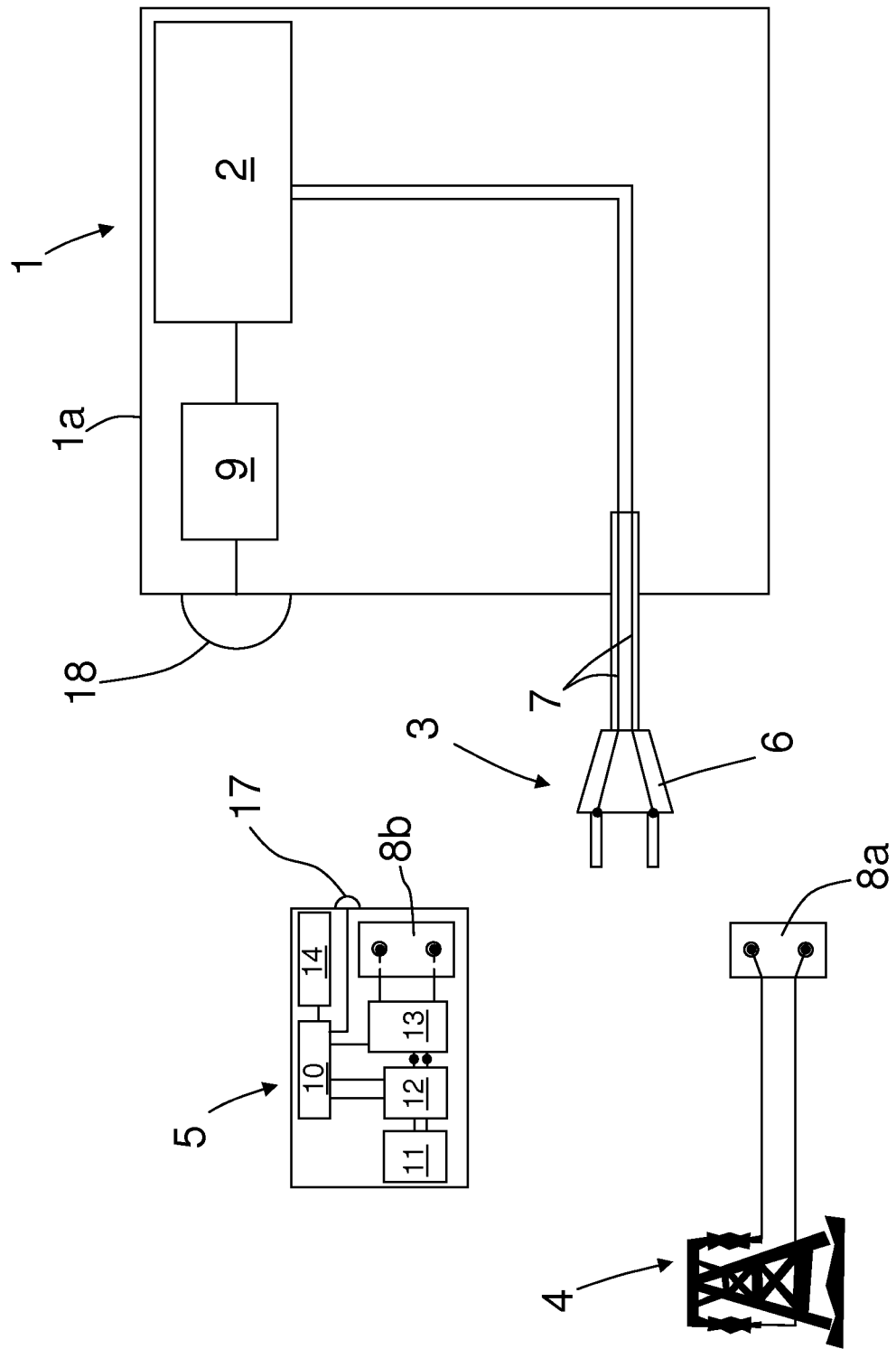
FIG. 6 is a schematic view of a further embodiment of an electrical assembly according to the invention.

In another embodiment, illustrated in FIG. 5, the power supply device 5 comprises both a battery 11 and a connector (for example a plug, not illustrated) for its electrical connection to the supply mains 4.

The battery 11 may be advantageously rechargeable, as in the embodiment illustrated in FIG. 5; in this case the power supply device 5 comprises also a battery charger 15 arranged in such a way that it may be electrically connected to the supply mains 4, so as to receive from the latter the electric power necessary for recharging the battery 11. In a further embodiment the battery 11 is non-rechargeable, and therefore the battery charger isn't provided.

In the embodiment of FIG. 5 the power supply device 5 is provided both with a DC-AC converter 13, electrically connected to the battery 11 (preferably, but not necessarily, via an electric feeder 12) and to the outlet connector of the power supply device 5 (in this example to the socket 8b), adapted to convert the direct current (DC) (and/or the direct voltage and/or power) produced by the battery 11 into a substantially alternated current (AC) (and/or alternated voltage and/or power), for example in a substantially sinusoidal current (or voltage) with a prefixed frequency, different from the frequency provided by the supply mains 4.

The power supply device 5 illustrated in FIG. 5 also comprises an AC-AC converter 16 electrically connectable to the supply mains 4 (directly, as in the embodiment illustrated in FIG. 5, or also via an electric feeder 12) and to the outlet connector of the power supply device 5 (in this example to the socket 8b), configured in such a way to convert the frequency of the alternated electric power provided by the supply mains 4 in an alternated electric power with a different frequency.

The DC-AC converter 13 and the AC-AC converter 16 may be controlled by the control unit 10 of the power supply device 5, which may be for example configured in such a way that, if the power supply device 5 is connected to the supply mains 4, only the AC-AC converter 16 functions and provides electric power to the plug 8b by converting the sinusoidal electric power and/or current and/or voltage provided by the supply mains 4 in a sinusoidal electric power and/or current and/or voltage with a different frequency; if the power supply device 5 is instead not connected to the supply mains 4, only the DC-AC converter 13 functions and provides electric power to the plug 8b by converting the direct electric power and/or current and/or voltage provided by the batter 11 in a substantially sinusoidal power and/or current and/or voltage with a specific frequency different from the frequency of the electric power of the supply mains 4.

In a further embodiment the power supply unit 5 is configured in such a way that if it is connected to the supply mains 4 and a battery 11 is also present, a user may set, preferably by the user interface 14, if the power supply has to be delivered to the outlet connector of the power supply device 5 (in this example to the socket 8b) by the supply mains (by the AC-AC converter 16), or by the battery 11 (by the DC-AC converter).

In the example of FIG. 5 the DC-AC converter 13 and the AC-AC converter 16 have been represented as distinct components, but they may clearly be comprised in a single component adapted to function both as a AC-AC converter and a DC-AC converter; moreover the AC-AC converter 16 and/or the DC-DC converter may be comprised in the electric feeder 12. Clearly the electric feeder 12 may also be not provided.

In all the embodiments described above, the power supply devices 5 is adapted to deliver to the household appliance 1 an alternated electric power and/or current and/or voltage with a frequency different from the frequency of the alternated electric power and/or current and/or voltage provided by the supply mains 4, so that the household appliance 1 may detect, by the detection device 9 (which is adapted to sense the frequency of the electric power, and/or current, and/or voltage) this frequency, and the logic unit 2 is adapted to understand that sensing this frequency corresponds to the fact that the household appliance 1 is connected to the power supply device 5 and not to the supply mains 4.

In a further embodiment the power supply device 5 may be adapted to transmit to the household appliance 1 the information that it is connected to the latter by acting on the value of other possible specific characteristics (for example the amplitude or a specific modulation) of the electric power (and/or current and/or voltage) that it provides to the household appliance 1 (and therefore not, or not only, on the frequency). For example the DC-AC converter 13 and/or the AC-AC converter 16 may be configured in such a way to generate and to deliver to outlet connector of the power supply device 5 a power and/or current, and/or voltage provided with a specific intensity modulation, which is not present in the power and/or current and/or voltage provided by the supply mains 4; in this case the detection device 9 (for example a main voltage detector 9a) is advantageously adapted to detect this modulation, and the logic unit 2 is opportunely configured so as to enable the performing of the demo mode only if the detection device 9 detects this modulation. Also in this case, therefore, if the household appliance 1 is already provided with a main voltage detector 9a, the household appliance 1 doesn't require hardware modifications, but only software modification on the logic unit 2, in order to understand if it is connected to the supply mains 4 or to the power supply device 5, and to enable or disable the performing of the demo mode accordingly.

Figure 7:
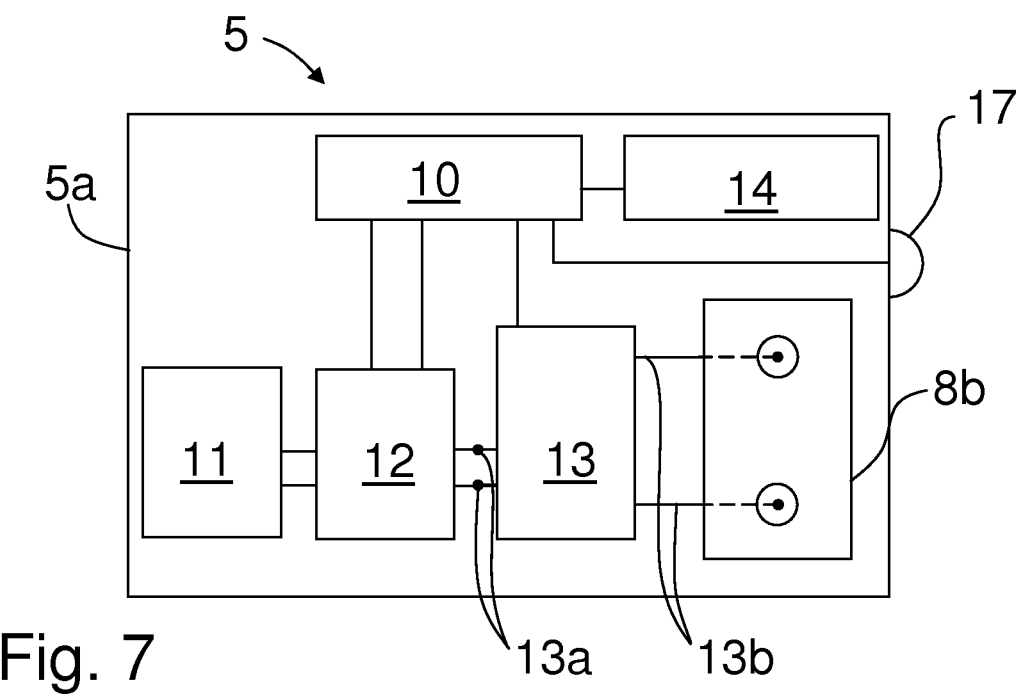
FIG. 7 is a schematic view of the power supply device of the electrical assembly of FIG. 6.

In a further embodiment, illustrated in FIG. 7, the power supply device 5 comprises a transmitting device 17 preferably, but not necessarily, connected to the control unit 10 of the power supply device 5, and adapted to transmit a signal, related to the fact that the power supply device 5 is connected to the household appliance 1, to a receiving device 18 comprised in the household appliance 1 and operatively associated to the detecting device 9.

In this case, therefore, when the household appliance 1 is connected to the power supply device 5, the transmitting device 17 transmits a specific signal to the receiving device 18 of the household appliance 1, the detecting device 9 of the latter detects this signal and transmits this information to the logic unit 2, and the latter enables the performing of the demo mode; if the household appliance 1 is connected to the supply mains 4, the receiving device 18 doesn't receive any signal from the transmitting device 17, and the detecting device 9 communicates this information (that is the fact that it is not receiving a signal from the transmitting device 17) to the logic unit 2, which enables the performing of the standard mode.

Advantageously the transmitting device 17 and the receiving device 18 may be wireless devices, that is devices adapted to transmit and receive signals without a physical connection to one another; for example the transmitting device 17 and the receiving device 18 may communicate by using radio frequency signals, or infrared signals, or a Bluetooth signals, etc.

In a further embodiment the transmitting device 17 and the receiving device 18 may be adapted to be physically connected to one another, in particular when the household appliance 1 is connected to the power supply device 5, for example by an electric cable, not illustrated, adapted to electrically connect the transmitting device 17 to the receiving device 18, so as to deliver electric signals from the transmitting device 17 to the receiving device 18.

Preferably the transmitting device 17 is operatively connected and/or integrated to the electronic control unit 10 of the power supply device 5.

Opportunely the receiving device 18 is operatively connected and/or integrated to the detecting device 9 of the household appliance 1.

Clearly, a transmitting device 17, analogous to the one described above, may be provided also in other possible power supply devices 5, for example analogous to the ones described in FIGS. 3 to 5; in this case the power supply device 5 may be arranged in such a way to deliver to the plug 8b (and therefore to the household appliance 1), an electric power substantially analogous to the electric power provided by the supply mains 4, because in this case the detecting device 9 detects that the household appliance 1 is connected to the power supply 5 (and not to the supply mains 4), by the information exchanged among the transmitting device 17 and the receiving device 18, without requiring a modification of the characteristics (i.e. of the frequency) of the electric power supplied to the plug 6.

It is seen therefore how the invention achieves the proposed aim and objects, there being provided a household appliance which may perform a demo mode only if it is powered by a power supply device external to the household appliance, while it may perform only a standard mode if it is powered by the supply mains, solving in this way the above indicated drawbacks of the known solutions.

In particular, when a household appliance according to the invention is exposed in a store, it may be connected to a power supply device according to the invention, ensuring in this case that each time the household appliance is switched on, the demo mode performing is enabled; in this case, therefore there it isn't necessary that an operator would directly enable the performing of the demo mode of the household appliance after its switching on, as in the known household appliances in which the demo mode is automatically disabled when the appliance is powered off. In addition the invention avoids the risk that a household appliance would start in a demo mode after selling, or that a user would inadvertently activate the demo mode after buying the household appliance; in fact after buying the household appliance, an user typically connects the latter to the supply mains (and therefore not to the power supply device according to the invention), and therefore the logic unit of the household appliance enables the performing of the standard mode.

Clearly more than one household appliance according to the invention may be connected in parallel to a single power supply device according to the invention; in this case the logic unit of all the household appliances enables the performing of the demo mode.

Moreover, if a household appliance is already provided with a main voltage detector, the invention may be applied to this household appliance by a simple software modification, and without any hardware modification, and therefore without a major increase of the costs of the household appliance.

The invention claimed is:

1. An electrical assembly including a household appliance selectively operable in a demonstration mode or a standard mode, and a power supply device, external to said household appliance adapted to deliver electric power to said household appliance;

said household appliance comprising a logic unit adapted to control electrical and/or electronic components of the household appliance, and to cause said household appliance to perform a standard mode or a demonstration mode; and a power supply circuit adapted to be connected to said power supply device or directly to the supply mains, in order to energize said logic unit and said other electrical and/or electronic components of the household appliance, wherein:

said household appliance further comprises a detection device adapted to detect if said power supply circuit is connected to said power supply device and to detect if the power supply circuit is connected directly to the supply mains, said logic unit is configured to enable the performing of said demonstration mode if said detection device detects that said power supply circuit is connected to said power supply device, and to enable the performing of said standard mode if said detection device detects that said power supply circuit is connected directly to the supply mains, and said power supply device is electrically connectable to said supply mains and comprises an AC-AC converter with input connections connectable to said supply mains, and output connections connectable to said household appliance, said AC-AC converter being configured so as to convert the alternated electric power and/or current and/or voltage delivered by said supply mains in an alternated electric power and/or current and/or voltage with one or more different electric characteristics.

2. An electrical assembly according to claim 1, wherein the alternated power and/or current and/or voltage outputted by said AC-AC converter has a frequency which is different from the frequency of the power and/or current and/or voltage provided by said supply mains.

3. An electrical assembly according to claim 1, wherein said detecting device is adapted to detect one or more electric characteristics of the power and/or current and/or voltage which is delivered to said power supply circuit, said detecting device being operatively connected to said logic unit, so as to communicate to the logic unit information related to the one or more electric characteristics of the power and/or current and/or voltage which it detects.

4. An electrical assembly according to claim 3 wherein said detecting device is adapted to detect the value of the frequency of the power and/or current and/or voltage present at said power supply circuit, said logic unit being configured so as to enable the performing of said demonstration mode if the frequency detected by said detecting device is different from one or more prefixed values corresponding to a frequency provided by said supply mains and/or if the frequency detected by said detecting device is substantially equal to a prefixed value which is different from the value of the frequency of said supply mains.

5. An electrical assembly according to claim 1, wherein said power supply device comprises a transmitting device adapted to transmit to a receiving device, comprised in said household appliance and operatively associated to said detecting device, a signal related to the fact that the power supply device is connected to said household appliance.

6. An electrical assembly according to claim 1, wherein said logic unit is configured in such a way that said demonstration mode automatically starts substantially as soon as said detection device detects that said power supply circuit is connected to said power supply device.

7. An electrical assembly according to claim 1, wherein said logic unit is configured in such a way that after enabling the performing of the demonstration mode, said demonstration mode is started if an action is performed by a user on a user interface provided as part of the household appliance, and/or if an action is performed by a user on an input device provided as part of the power supply device.

8. An electrical assembly according to claim 1, wherein said household appliance and/or said power supply device comprises a presence sensor adapted to detect the presence of a user in proximity to the household appliance and/or to the power supply device, and to communicate to said logic unit the presence of this user, said logic unit being configured in such a way that, if the performing of said demonstration mode has been enabled, said demonstration mode starts if said presence sensor senses the presence of an user.

9. An electrical assembly according to claim 1, wherein said logic unit is configured in such a way that if the performing of said demonstration mode has been enabled, the demonstration mode automatically starts or ends at a prefixed time.

10. An electrical assembly according to claim 9, wherein said detecting device is adapted to detect one or more electric characteristics of the power and/or current and/or voltage which is delivered to said power supply circuit, said detecting device being operatively connected to said logic unit, so as to communicate to the latter information related to the one or more electric characteristics of the power and/or current and/or voltage which it detects.

11. An electrical assembly according to claim 1, wherein said power supply device comprises a battery and a DC-AC converter adapted to convert the direct power and/or current and/or voltage produced by said battery in a substantially alternated power and/or current and/or voltage provided with one or more electric characteristics different from the corresponding electric characteristics of the power and/or current and/or voltage provided by the supply mains, said DC-AC converter being adapted to provide said alternated power and/or current and/or voltage to said household appliance.

12. An electrical assembly according to claim 11, wherein said alternated power and/or current and/or voltage outputted by said DC-AC converter has a frequency which is different from the frequency of the power and/or current and/or voltage provided by said supply mains.

13. An electrical assembly according to claim 12, wherein said detecting device is adapted to detect one or more electric characteristics of the power and/or current and/or voltage which is delivered to said power supply circuit, said detecting device being operatively connected to said logic unit, so as to communicate to the latter information related to the one or more electric characteristics of the power and/or current and/or voltage which it detects.

14. An electrical assembly according to claim 11, wherein said battery of said power supply device is rechargeable, and said power supply device comprises a battery charger arranged in such a way that it may be electrically connected to the supply mains, so as to receive from the supply mains electric power for recharging said battery.

15. An electrical assembly according to claim 14, wherein said detecting device is adapted to detect one or more electric characteristics of the power and/or current and/or voltage which is delivered to said power supply circuit, said detecting device being operatively connected to said logic unit, so as to communicate to the latter information related to the one or more electric characteristics of the power and/or current and/or voltage which it detects.

16. An electrical assembly according to claim 11, wherein said detecting device is adapted to detect one or more electric characteristics of the power and/or current and/or voltage which is delivered to said power supply circuit, said detecting device being operatively connected to said logic unit, so as to communicate to the latter information related to the one or more electric characteristics of the power and/or current and/or voltage which it detects.

17. An electrical assembly according to claim 1, wherein said detecting device is adapted to detect one or more electric characteristics of the power and/or current and/or voltage which is delivered to said power supply circuit, said detecting device being operatively connected to said logic unit, so as to communicate to the latter information related to the one or more electric characteristics of the power and/or current and/or voltage which it detects.

18. An electrical assembly according to claim 1, said logic unit and said electrical and/or electronic components being housed within a casing of the appliance, said power supply circuit further comprising a cable extending externally of said casing to a plug, said plug being external of said casing, connected to the logic unit by said cable, and adapted to be selectively and alternatively connected to said power supply device and directly to the supply mains.

* * * * *